May 13, 1969   D. M. HARVEY   3,443,502
AUTOMATIC FOCUSING FOR CAMERAS
Filed Aug. 23, 1966   Sheet 3 of 3
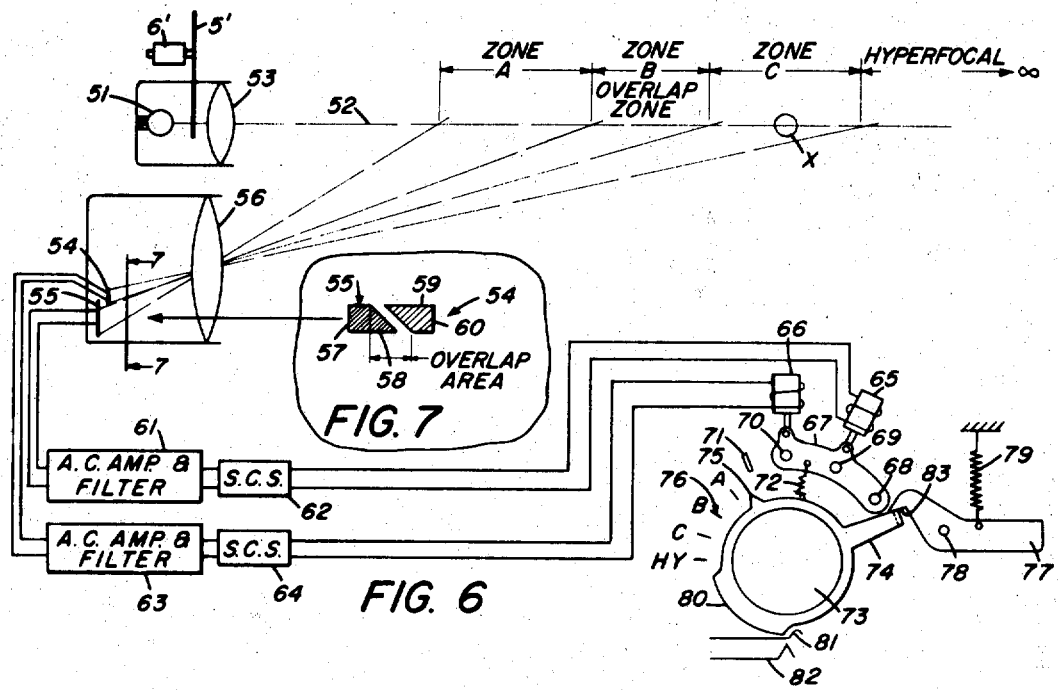
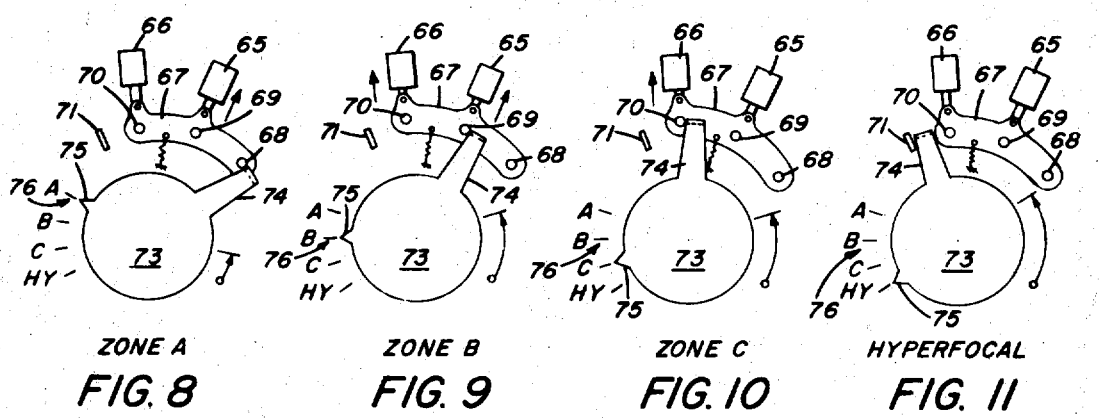
| ZONE A | ZONE B | ZONE C | HYPERFOCAL |
| --- | --- | --- | --- |
| FIG. 8 | FIG. 9 | FIG. 10 | FIG. 11 |
DONALD M. HARVEY
INVENTOR
BY *Morton A. Polster*
*Robert W. Hampton*
ATTORNEYS United States Patent Office 3,443,502
Patented May 13, 1969

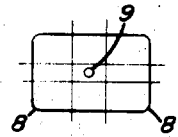
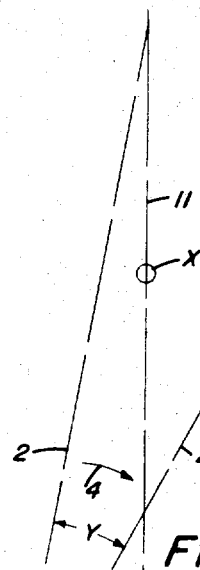
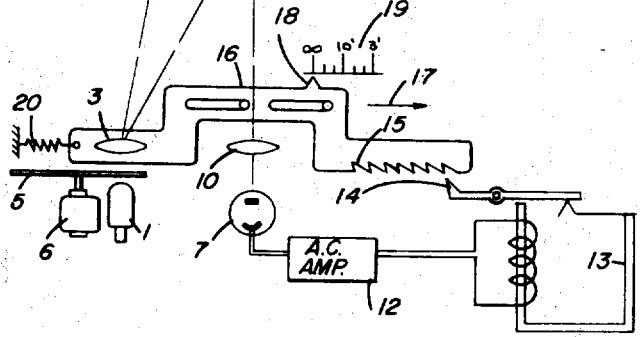
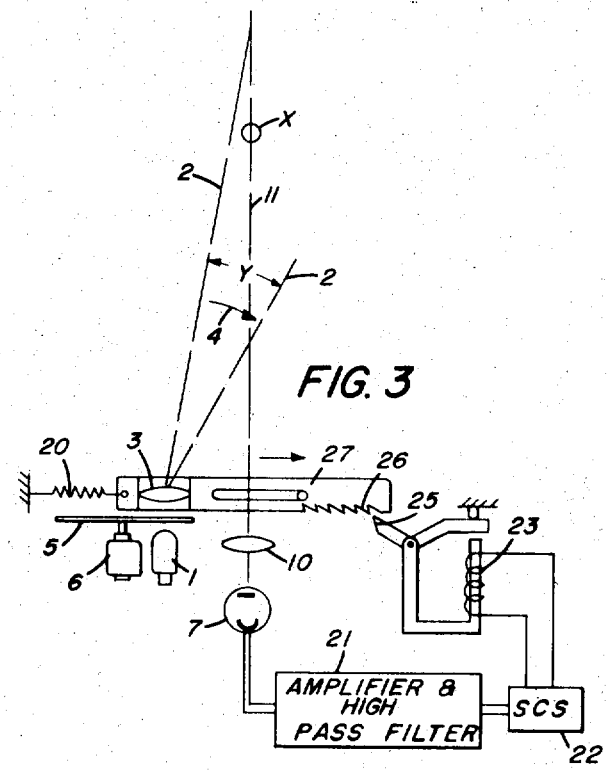

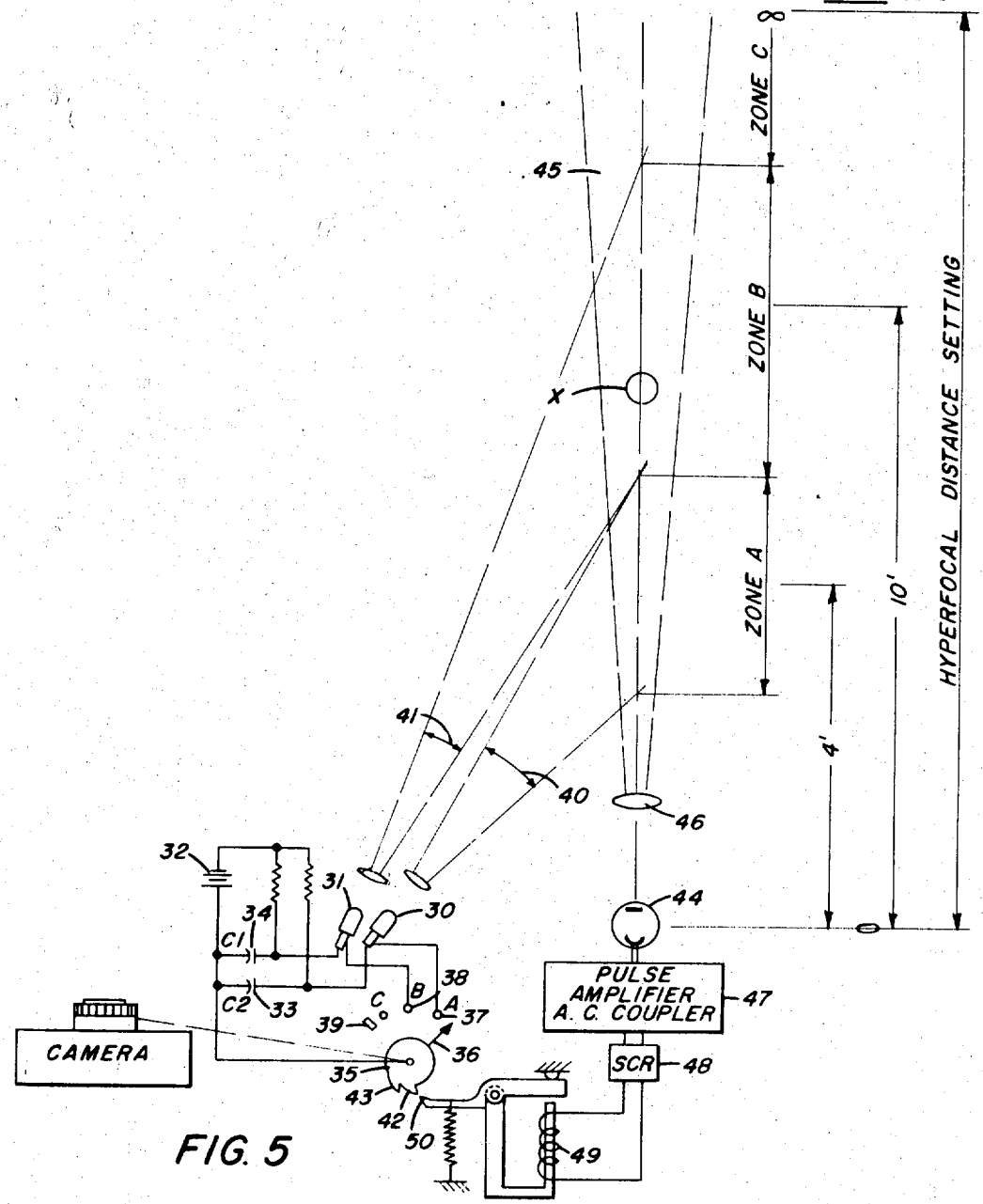

3,443,502
AUTOMATIC FOCUSING FOR CAMERAS
Donald M. Harvey, Rochester, N.Y., assignor to Eastman Kodak Company, Rochester, N.Y., a corporation of New Jersey
Filed Aug. 23, 1966, Ser. No. 574,393
Int. Cl. G03b 3/10
U.S. Cl. 95—44                              8 Claims

ABSTRACT OF THE DISCLOSURE

A photographic camera wherein a light source emits an intermittent beam which is moved angularly to sweep the field of the camera lens. The motion of the light source is linked to and calibrated with concomitant motion of the lens-focus-adjustment, so that the lens is always focused for the distance from lens to the point at which the light beam crosses a line-of-sight path between the lens and the object. A sensor, selectively responsive to the intermittent light beamed by the light source, is positioned to receive light reflected from the object and, upon receiving this reflected light, the displacement of the focus-adjustment is arrested thus positioning and holding the camera lens at the correct range adjustment.

---

This invention relates to photographic cameras and, more particularly, to means for determining automatically the distance from the camera to subject to be photographed and for automatically adjusting the focus of the camera lens in accordance with that determination.

Although many photographic cameras are now provided with means for automatically adjusting the shutter speed and/or lens opening in response to the illumination of the scene to be photographed, no commercially successful cameras have embodied means to determine the distance from the camera to the subject automatically, that is, without requiring the photographer to make a manual focus setting based upon his visual estimate of the distance to the subject to be photographed or upon his ability to superimpose one or more images thereof formed by an optical range finder device. However, pending U.S. patent application Ser. No. 554,072 in the name of Allen G. Stimson, discloses a fully automatic camera which accomplishes this objective by means of the following apparently practical system: a narrow light beam is emitted from the camera, and light reflected from the area of the subject illuminated by the beam is detected by a light sensing device which is spaced from the light source; the angular displacement between the projected beam and its reflection is then measured, and this measured displacement is translated automatically into an indication of the distance from the camera to the subject and/or into an appropriate camera lens focus adjustment.

The present invention is related to a camera rangefinder system employing this same general mode of operation, with a primary object of the invention being to simplify and improve the reliability of such a device. More particularly, it is an object of the invention to simplify the construction of such a rangefinder device embodied in a camera, by eliminating the necessity for moving critically located optical elements during the distance measuring operation, thereby averting the need for precise and wear-resistant pivotal mounting structures for such movable optical elements.

Another object of the invention is to provide simple and dependable means for translating the distance determination made by the rangefinder into a corresponding adjustment of the camera lens in response to actuation of the rangefinder system, but without any further manual operation being required.

Still another object of the invention is to reduce the susceptivity of such a rangefinder system to being influenced spuriously by light originating from sources other than the rangefinder system.

These and other important objects of the invention will appear from the following description of two basic arrangements of automatic focusing apparatus using the above-mentioned method of rangefinding. In one form of the apparatus disclosed, the light source emits an intermittent beam which is moved angularly to sweep the field of the camera lens. The motion of the light source is linked to and calibrated with concurrent motion of the lens-focus-adjustment means so that the lens is always focused for the distance from lens to the point at which the light beam crosses a line-of-sight path between the lens and the object. A means selectively responsive to the intermittent light beamed by the light source is positioned to receive beam light reflected from the object and, upon receiving this reflected light, stops the motion of the focus-adjustment means at that point, thus positioning and holding the lens in its correct range adjustment. In a variation of this first arrangement, a plurality of stationary light beams are sequentially energized and extinguished to provide the beam sweep of the field and a concurrent "zone" type ("close-up," "medium," "far") focus adjustment.

The second basic arrangement referred to above also provides a "zone" type focus adjustment. However, in this preferred arrangement the light beam is projected directly along the line-of-sight path, and sensing means, which is laterally offset from the line-of-sight path, is selectively sensitive to the particular "zone" from which the projected beam is reflected.

As used in describing and claiming the present invention, the term "range" is used to refer to the distance between the camera, i.e., the aim point, and a photographic subject or point remote from the camera; and the term "light" refers to any radiation in the electromagnetic spectrum from infrared through ultraviolet, inclusive. Also, the term "intermittent light" refers to such radiation which is caused to pulsate by electrical, mechanical or other means, e.g., a so-called wink light; and the term "frequency" is used with regard to such radiation, not in terms of the spectral frequency or wavelength thereof, but rather in terms of the time relation of such radiant pulses.

The novel features considered characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

FIG. 1 is a schematic diagram of one embodiment of a camera rangefinder according to the present invention;

FIG. 2 illustrates a camera viewfinder used in conjunction with all of the disclosed embodiments of the present invention;

FIG. 3 is a schematic diagram of a variation of the camera rangefinder illustrated in FIG. 1 modified to provide automatic focusing according to the present invention, with some parts (shown in FIG. 4) being omitted for clarity;

FIG. 4 is a plan view of the embodiment of FIG. 3, showing the linkage used to adjust the lens of the camera in accordance with the distance determination made by the automatic rangefinder;

FIG. 5 is a schematic diagram of a second embodiment of automatic focusing apparatus according to the present invention, this embodiment using a "zone" type modification of the range-finding method shown in FIG. 1;

FIG. 6 is a schematic diagram of the preferred embodiment of automatic-focusing apparatus according to the invention herein using a further modification of the "zone" type range-finding method;

FIG. 7 is a plan view of the photocell arrangement used in the embodiment of FIG. 6; and FIGS. 8 through 11 also relate to the preferred embodiment, being plan views of the lens and its associated focus adjusting means set for different "zone" settings.

Referring now to FIG. 1 of the drawings, one embodiment of rangefinding apparatus according to the present invention is disclosed as it might operate in a photographic camera. A lamp 1 projects a light beam 2 through lens 3. (As noted above, the "light" may be any selected radiation from infrared to ultraviolet, and lamp 1 is merely an appropriate source of such radiation.) Means (not shown) are provided to move a rack 16 and lens 3 to the right, as viewed in FIG. 1, thus rotating light beam 2 through an angle Y and in a direction of rotation shown by the arrow 4. Light beam 2 is caused to pulsate by a mechanical chopper 5, which is rotated by motor 6. It should be understood, of course, that as mentioned above, other means could be employed to achieve such pulsation.

A photocell 7, or similar light sensitive means, is positioned on the camera (not shown), laterally from and in predetermined relation to lens 3, so that when the camera's picture-taking lens is directed at the subject to be photographed, the photocell is also directed at the subject. More specifically, as seen in FIG. 2, the viewfinder used with this invention has the normal framing marks 8 which are used to show what portion of the scene being viewed will be recorded on film. In addition, a dot 9 is located in the center of the viewfinder, indicating the point at which photocell 7 is aimed. Photocell 7 views the photographic subject through a lens 10 at a very narrow angle which is indicated by the line 11 in FIG. 1. Thus, by centering dot 9 on the object to be photographed, photocell 7 monitors the line-of-sight path extending from the camera through the subject.

Photocell 7 is AC coupled to an amplifier 12 which is in turn electrically connected to a reed relay 13. The armature of relay 13 carries a pawl 14 which engages notch members 15 of rack 16 when the relay is activated by a signal initiated by the photocell, as will be explained below.

As seen in FIG. 1, light-projecting lens 3 is fixedly mounted on rack 16, which is moved in the direction of arrow 17 by means not shown, such as by a linkage connection with motor 6. When rack 16 is moved, it carries lens 3 with it. Located on rack 16 is a pointer 18 which cooperates with a scale 19 to indicate the distance from the aim point, in this case the camera, to the point at which light beam 2 crosses line-of-sight 11.

The operation of this embodiment is essentially as follows. The operator trains the camera on the photographic subject by centering dot 9 thereon. Then, by operating a rangefinder actuating member (not shown), the operation of the automatic rangefinder is initiated. The beam from lamp 1 is chopped by chopper 5 at a designated frequency and projected through lens 3. The position of lens 3 at the start of the operation is such that the light beam is directed toward some point at a distance corresponding to the hyperfocal range setting of the camera, i.e., the range in which all subjects may be considered as infinitely distant from the camera for focusing purposes.

When the finder mechanism is actuated, rack 16 carries lens 3 to the right and causes the light beam 2 to move through the angle Y, thereby sweeping beam 2 across and along line-of-sight 11 toward the camera. At the same time, pointer 18 also moves to the right, thus indicating on scale 19 the range to the point at which beam 2 crosses line-of-sight 11.

A photographic subject is designated schematically as X in FIG. 1. When beam 2 sweeps over object X, a portion of the beam is reflected along line-of-sight 11 and is sensed by photocell 7. The output signals of photocell 7 are transmitted to amplifier 12. The photocell, of course, is sensitive to ambient light as well as to the reflected light beam, but by virtue of the AC coupling between photocell 7 and amplifier 12, the system is sensitive only to intermittent light. However, in addition to the chopped light reflected from subject X, photocell 7 may also sense intermittent light emitted by incandescent and flourescent lamps operating on alternating current. Therefore, appropriate filtering of the output of photocell 7 is necessary in order to distinguish the desired signal. In this embodiment, the filtering is accomplished by mechanical means, namely, by designing chopper 5 to provide a beam frequency which is resonant with reed relay 13 and not harmonic with the frequency of the alternating current used to energize such lamps. In the United States such alternating current frequency is almost universally 60 cycles per second and, hence, a camera intended for domestic use would be designed to emit an intermittent beam which is non-harmonic with that frequency. If the camera is intended for use in another locality where a different alternating current frequency is employed, the beam chopping device would be adapted to produce a beam which is non-harmonic with that particular frequency. If desired, of course, adjusting means may be incorporated in the camera itself to enable the operator to adjust the frequency of the rangefinder light beam to prevent interference from light sources of other frequencies.

When cell 7 senses light beam 2 reflected from subject X, the resulting signal produced by amplifier 12 is sufficient to cause relay 13 to resonate at the chopper frequency, and pawl 14 engages ratchet 15, thereby stopping the movement of rack 16 and lens 3 and holding light beam 2 on subject X. The range to the object is now indicated on scale 19 by pointer 18.

Attention is called to the fact that the sweep time of light beam 2 must be relatively fast in order to negate the effect of camera motion in the hands of the operator while the rangefinding system is operating. Also, when used to adjust automatically the focus of a camera, as will be explained in more detail below, appropriate means are provided to reset the system following each film exposure. By using means similar to resetting means known in the automatic exposure control art, when the rangefinder function is completed, motor 6, or other rack-driving means (not shown), is disconnected from rack 16, thus allowing a spring 20 to withdraw rack 16 to its starting position, resetting the mechanism for the next exposure.

Referring now to FIGS. 3 and 4, there is shown a first embodiment of automatic focusing apparatus according to the present invention. The arrangement and operation of the rangefinding mechanism of this embodiment is essentially the same as that of the mechanism illustrated in FIG. 1 and just described above. The light beam 2 is chopped (a wink light or other similar device may be used) and swept through the angle Y by movement of rack 27 to the right. When beam 2 intercepts subject X, which is located on line-of-sight 11, a portion of beam 2 is reflected to cell 7, and a signal is then sent to the amplifier 21. In this embodiment, however, the filtering of possible intermittent light from other sources is accomplished by selecting an appropriate chopper frequency greater than the frequency of such possible interfering sources and by including a high-pass filter in amplifier 21. Thus, only the high frequency signal created by the chopped light beam will be amplified. This amplified signal fires a silicon controlled switch 22 which in turn actuates a solenoid 23 to cause pawl 25 to engages ratchet 26. The motion of rack 27 is thus halted, thereby stopping the sweep of light beam 2 and holding the beam on the subject X.

FIG. 4 shows the lens adjusting mechanism (omitted from FIG. 3 for the sake of clarity) which is automatically set to maintain the proper range focus to the point at which light beam 2 crosses line-of-sight 11 of photocell 7. The pawl 25 and ratchet 26 arrangement illustrated in FIG. 3 can be seen at the top of rack 27 in FIG. 4, and on the bottom portion of rack 27 is another series of teeth 28 which intermesh with teeth 29 located around picture-taking lens 30. As rack 27 moves to the right and sweeps light beam 2 through arc Y, the intermeshing teeth 28 and 29 rotate lens 30 in a clockwise direction to adjust the focus of the lens.

The elements of the combination shown in FIG. 4 are so selected and arranged that adjustment of the camera lens 30 corresponds with the angular rotation of light beam 2, such that the lens focus is adjusted at all times to the distance between lens 30 and the point at which light beam 2 crosses line-of-sight 11. As the light beam sweeps towards the camera, the focal distance of lens 30 is correspondingly adjusted from its hyperfocal setting towards its "near point" setting. After film exposure, the pawl is released, by means not shown, and the linkage is returned to the starting position by spring 20, the interaction of teeth 28 and 29 causing lens 30 to rotate in a counterclockwise direction to return lens 30 to its initial position which, in this embodiment, is its hyperfocal range setting. As noted above, the movement of the light beam through the angle Y must be very rapid to avoid any error due to the movement of the camera by the operator.

The two above-described rangefinding embodiments may both be described generally as "continuous" systems, since the motion of the light beam is continuous through the angle which defines the parameter of the rangefinding system. The preferred embodiments that will now be discussed may be more easily understood as "zone" systems, i.e., in which more than one light source or photocell is employed, each being restricted to its own zone. However, it should be noted that whether the apparatus is designed for "continuous" or "zone" monitoring, the basic rangefinding concept is the same, namely: object-reflections of source light are monitored by receiving means located in a predetermined position offset laterally relative to the light source to determine the altitude of the triangle formed by the source, the object and the receiving means.

Referring now to FIG. 5, a zone system is shown utilizing two lamps 30 and 31 which flash intermittently and in sequence. A power source 32 is connected to each of the lamps by parallel circuits including, respectively, capacitors 33 and 34. The circuits are normally open and may be closed by the rotation of switch 35 having a movable contact point 36.

As point 36 contacts point 37, lamp 30 flashes as capacitor 33 discharges through it. Similarly, upon contact of points 36 and 38, lamp 31 will flash as capacitor 34 discharges. Means (not shown) are provided to drive the switch 35 in a counterclockwise direction when the operator actuates the rangefinder, thus closing, in sequence, both contact points 37 and 38. Switch 35 has two notches 42 and 43 which may be engaged to stop the counterclockwise rotation at either point 37 or 38 as will be explained. However, if neither notch 42 or 43 are so engaged, switch 35 will continue to rotate until pointer 36 reaches stop 39.

Lamp 30 is mounted on the camera so that its beam spread 40 illuminates a predetermined "Zone A" in the confined field-of-view 45 of the photocell 44. Similarly, lamp 31 is supported on the camera so that its beam spread 41 covers a second "Zone B" which as adjacent Zone A. (The distances of 4' and 10' assigned to the center points, respectively, of Zones A and B, are merely illustrative and are in no way critical to the operation of the disclosed rangefinding device.) As in the other embodiments, the cell 44 is mounted on the camera in a predetermined relation to a lens 46 which confines and directs its field-of-view as desired.

Photocell 44 is AC coupled to amplifier 47 which is in turn coupled to a silicon controlled rectifier 48. The rectifier is electrically connected to a solenoid 49 having a pawl which, when the solenoid is activated, may engage either notch 42 or 43 of the switch 35.

The operation of this embodiment will now be described: The camera is directed at the photographic subject so that subject X lies within field-of-view 45 of photocell 44. When the rangefinder is actuated, switch 35 begins to rotate counterclockwise, closing contact 37, and thereby firing lamp 30. This projects a beam from lamp 30 which covers Zone A.

Assuming first that subject X is within Zone A, a reflection of a portion of the light beam will be picked up by photocell 44 and a signal transmitted to rectifier 48. Since the amplifier is AC coupled to the cell, the effects of ambient light are eliminated, and the amplifier receives only the signal produced by the intermittent light. This amplifier signal is fed to rectifier 48, thereby activating solenoid 49, and pawl 50 engages notch 42, halting the rotation of the switch. Similar to the first embodiment described above, the switch may be interconnected with the camera's lens adjusting means (not shown in FIG. 5) whereby, as the switch rotates, the lens focus is adjusted to provide a range setting corresponding to each successive zone. Thus, if the subject is in Zone A, the movement of switch 35 closing contact 37 adjusts the lens, through an appropriate linkage arrangement, to the setting corresponding to the median distance for Zone A.

If the subject is not within Zone A, solenoid 49 will not be activated and the switch will continue to rotate until it closes contact 38, thereby firing lamp 31. The beam from lamp 31 is directed toward Zone B which is adjacent Zone A but further from the camera. If subject X is in this zone, a reflection is returned to cell 44 and the switch will, therefore, continue to rotate until it reaches stop member 39. This additional rotation adjusts the lens to its hyperfocal setting and the stop member holds the lens in this setting.

In the embodiment just described, the lens has three possible focus settings: for Zones A, B and C. Obviously, the number of settings may be increased by increasing the number of zones and by having a separate lamp, contact, notch, etc., for each zone.

A coil spring may be attached to the switch 35 to cause the switch to rotate in a clockwise direction after an exposure is made, thereby returning the switch and the lens to their respective starting positions. Means should be provided to prevent the firing of the lamps on the switch's return motion, and this may be accomplished by opening the battery circuit or by making contacts 37 and 38 flexible members having a non-conducting material on the back to prevent electrical contact as point 36 moves in a clockwise direction.

The preferred "zone" type automatic focusing mechanism is shown schematically in FIG. 6. While this embodiment uses only one lamp, the field is monitored by two light-sensitive cells. A single lamp 51 is supported on the camera so that its beam 52 is directed at the subject X. This lamp also operates intermittently, i.e., in wink light fashion or interrupted driven by motor 6', as in previous embodiments. The light beam 52 is collimated to a narrow angle by a lens 53 and coincides with dot 9 of the viewfinder shown in FIG. 2.

Two photocells 54 and 55 are mounted behind lens 56. Although the photocells are positioned end to end, they are so shaped that a portion of each lies in side by side relationship. This can best be seen in FIG. 7, which is a plan view of the photocells taken along lines 7—7 of FIG. 6. A portion 57 of photocell 55 is located at one end of the pair of cells with no adjacent portion of the cell 54 lying along side. The portions 58 and 59 of photocells 55 and 54, respectively, are side by side, while the end portion 60 of cell 54 is not adjacent any portion of cell 55.

Referring once more to FIG. 6, cell 55 is electrically connected to amplifier-filter 61. This amplifier is AC coupled, as in the previous embodiments, thus eliminating the effect of ambient light to assure selective response to signals generated by intermittent light originating only from lamp 51. Amplifier 61 is operatively connected to a silicon controlled switch 62 which, in turn, operates a solenoid 65. A like arrangement exists for cell 54, using AC coupled amplifier 63, silicon controlled switch 64, and solenoid 66.

The solenoids 65 and 66 are operatively connected to a linkage member 67 on which three stops 68, 69 and 70 are located. In addition to these stop members, there is an additional stop 71 located adjacent linkage 67. A spring member 72 holds linkage 67 in the position shown in FIG. 6.

The camera lens 73 is shown in its position relative to linkage 67. Connected to lens 73 is a lug member 74 which is biased in a counterclockwise direction by a spring member which is not shown. Also connected to lens 73 is a pointer 75 which rotates with lens 73 to indicate the range setting of the lens on a scale 76. A rangefinder actuating member 77 is pivotally mounted at the point 78 and is held in the position shown by a spring 79. A hook member 83 contacts the lip of lug member 74 and prevents the lug, and in turn lens 73, from rotating in the counterclockwise direction to which they are urged by the coil spring which is not shown. An abutment 80 is also located on the periphery of the lens 73. As the lens rotates in the counterclockwise direction, the abutment 80 closes switch contacts 81 and 82, which energize lamp 51 and amplifier 61 and 63 by circuitry which is not shown.

The operation of this embodiment is as follows. The camera is aimed at the subject to be photographed, the dot 9 of the viewfinder being centered thereon. Actuating member 77 is then depressed against the bias of the spring 79 to cause hook member 83 to disengage lug member 74, thereby freeing lens 73 for movement in the counterclockwise direction to which it is biased. As the lens rotates, abutment 80 also moves in a counterclockwise direction and closes switch contacts 81 and 82, energizing the lamp and amplifier circuits. This projects intermittent beam 52 toward the subject X.

Assuming that subject X is located in Zone A, part of light beam 52 is reflected from subject X towards lens 56 which, by its relationship with the pair of cells 54 and 55, causes the reflected beam to fall on portion 57 of photocell 55. This produces a signal which is amplified and transmitted to silicon controlled switch 62, actuating switch 62 and thereby energizing solenoid 65 which, in turn, moves counterclockwise until the lip of lug 74 strikes stop member 68. This motion is sufficient to correctly focus the lens for the median distance to Zone A. This is indicated by the position of the marker 75 on the scale 76.

However, assuming that the subject is not in Zone A of FIG. 6 but is, instead, in Zone B, the reflection of the light beam is directed onto side-by-side portions 58 and 59 of photocells 55 and 54, respectively. As a result, both cells emit signals, thereby actuating both solenoids 65 and 66. This moves linkage 67 into the position shown in FIG. 9, allowing the lip of lug 74 to clear stop member 68, whereby lens 73 continues to move until the lip contacts stop 69. The additional rotation from stop 68 and 69 adjusts the focus of the lens for the median distance to Zone B.

Similarly, should subject X be in Zone C as illustrated, the reflected light strikes only portion 60 of photocell 54, thereby actuating only solenoid 66. This moves linkage 67 into the position shown in FIG. 10 which permits lug 74 to rotate until its lip contacts stop 70, adjusting the lens to a range setting for Zone C.

If the subject is not in Zones A, B, or C, but is, instead in the hyperfocal zone, no reflected light beam is received by photocells 54 and 55 due to the arrangement of the elements involved. Consequently, neither of the solenoids 65 or 66 is actuated, and the linkage remains in the position shown in FIG. 10, thus allowing the lip of lug 74 to pass by stops 68, 69, and 70 and to come to rest against stop 71. This degree of rotation adjusts the lens to its hyperfocal setting.

Although certain specific embodiments of the invention have been shown and described, many modifications thereof are possible. Therefore, the invention is not to be limited to the specific details shown and described, but is intended to cover all modifications coming within the scope of the appended claims.

What is claimed is:

1. A photographic camera including a rangefinder device comprising:
   (a) means for projecting at least one beam of light from said camera and for moving said beam through an angular displacement;
   (b) reflected light sensing means for detecting light reflected thereto along at least one predetermined path and for generating a signal in response to such detection;
   (c) support means mounting said light projecting means and said reflected light sensing means in predetermined relation to define at least one zone at a predetermined range from said camera, each respective zone produced by the angular displacement of said beam of light being defined at the extremes thereof by the intersections of said one beam of light and said one predetermined path; and
   (d) means responsive to said generated signal for respectively identifying the particular zone occupied by an object from which light from the light projecting means is reflected and detected by the reflected light sensing means.

2. A camera according to claim 1 including:
   (a) an image receiving plane;
   (b) an objective lens movable to any one of a plurality of focal positions relative to said plane for focusing on said plane the image of an object located, respectively, in said zone; and
   (c) focusing means operatively connected to said signal responsive identifying means for moving said objective lens automatically to the one of said plurality of focal positions corresponding to the particular zone so identified by said signal responsive identifying means.

3. A camera according to claim 2 wherein said focusing means includes:
   (a) means for moving said objective lens from an initial position through said plurality of focal positions, and
   (b) electromagnetic means responsive to said generated signal for arresting the movement of said objective lens at the focal position corresponding to the particular one of said zones so identified by said signal responsive identifying means.

4. A camera according to claim 1 wherein said light projecting means projects a plurality of light beams and said reflected light sensing means detects light reflected thereto along only one predetermined path intersected by said light beams, said camera further including light control means for initiating and extinguishing each of said plurality of light beams in predetermined sequence.

5. A camera according to claim 4 including means operatively connecting said signal responsive identifying means and said light conrtol means for indicating the particular one of said plurality of light beams being projected by the light projecting means at the time said signal is generated.

6. A camera according to claim 1 wherein said light projecting means projects only a single light beam and said reflected light sensing means detects light reflected thereto along a plurality of predetermined paths intersecting said single light beam.

7. A camera according to claim 6 wherein said reflected light sensing means includes a plurality of photo-responsive elements positioned to detect selectively light reflected thereto along each of said plurality of predetermined paths.

8. A camera according to claim 7 wherein two of said photo-responsive elements are positioned so that the detection paths thereof overlap, whereby a portion of said projected light beam reflected from an object located in the overlapping portion of said paths will be detected by both of said photo-responsive elements.

References Cited

UNITED STATES PATENTS

| 2,216,716 | 10/1940 | Withem | 250—221 |
| 3,249,006 | 5/1966 | Stauffer | 352—140 |
| 3,264,935 | 8/1966 | Vose | 352—140 |
| 3,342,102 | 9/1967 | Maxon | 352—140 |

NORTON ANSHER, *Primary Examiner.*

CHARLES B. FUNK, *Assistant Examiner.*

U.S. Cl. X.R.

352—140